(12) United States Patent
Kishinevski et al.

(10) Patent No.: US 11,028,004 B2
(45) Date of Patent: Jun. 8, 2021

(54) TWISTED GLASS CANES FOR ARTISTS

(71) Applicant: Anatoly Glass, LLC, North Hatfield, MA (US)

(72) Inventors: Anatoly Kishinevski, Holyoke, MA (US); Justin Herzig, North Hatfield, MA (US); Dominick Fiordimalva, Wilmington, NC (US)

(73) Assignee: ANATOLY GLASS, LLC, North Hatfield, MA (US)

(*) Notice: Subject to any disclaimer, the term of this patent is extended or adjusted under 35 U.S.C. 154(b) by 134 days.

(21) Appl. No.: 15/903,238

(22) Filed: Feb. 23, 2018

(65) Prior Publication Data

US 2018/0244558 A1 Aug. 30, 2018

Related U.S. Application Data

(60) Provisional application No. 62/463,693, filed on Feb. 26, 2017.

(51) Int. Cl.
*C03B 37/14* (2006.01)
*C03B 37/075* (2006.01)
(Continued)

(52) U.S. Cl.
CPC ........ *C03B 37/14* (2013.01); *C03B 37/01211* (2013.01); *C03B 37/01225* (2013.01);
(Continued)

(58) Field of Classification Search
CPC ... C03B 37/14; C03B 37/01262; C03B 37/03; C03B 37/01225; C03B 37/01211; C03B 37/16; C03B 37/0753; C03B 2203/34; C03B 2203/02; C03B 2205/07; C03B 37/01205; C03B 13/01211; C03B 37/025; C03B 37/027; C03B 37/02763; C03B 37/028; C03B 2203/06; C03B 2203/20; C03B 23/047; C03C 13/00
See application file for complete search history.

(56) References Cited

U.S. PATENT DOCUMENTS 1,892,901 A * 1/1933 O'Neill .................... G03C 7/06
430/7
5,940,054 A * 8/1999 Harris .................. G02B 26/026
345/107
(Continued)

OTHER PUBLICATIONS

Delphi Glass, https://www.delphiglass.com/96-coe-glass/cane/warms-rod-and-twisted-cane-assortment-96-coe, 2010. (Year: 2010).*
(Continued)

*Primary Examiner* — Queenie S Dehghan
(74) *Attorney, Agent, or Firm* — Browdy and Neimark, P.L.L.C.

(57) ABSTRACT

A glass cane is manufactured by filling a glass tube with a combination of glass structures forming a cross-sectional pattern within the glass tube, to form a preform. The preform is attached to a draw assembly, such as a draw tower. The draw assembly is operated to draw the preform to a reduced-diameter glass cane by passing the preform through a furnace of the draw assembly while pulling the preform or the reduced-diameter glass cane and rotating the preform or the reduced-diameter glass cane.

12 Claims, 23 Drawing Sheets

(51) Int. Cl.
*C03B 37/16* (2006.01)
*C03B 37/012* (2006.01)
*C03B 37/03* (2006.01)
*C03C 13/00* (2006.01)

(52) U.S. Cl.
CPC ........ *C03B 37/01262* (2013.01); *C03B 37/03* (2013.01); *C03B 37/0753* (2013.01); *C03B 37/16* (2013.01); *C03C 13/00* (2013.01); *C03B 2203/02* (2013.01); *C03B 2203/34* (2013.01); *C03B 2205/07* (2013.01)

(56) References Cited

U.S. PATENT DOCUMENTS

| | | | | |
|---|---|---|---|---|
| 6,173,588 | B1* | 1/2001 | Berkey | C03B 37/01211 65/36 |
| 8,863,556 | B2 | 10/2014 | Bayindir et al. | |
| 2004/0000169 | A1* | 1/2004 | Fagan | C03B 23/047 65/108 |
| 2004/0206128 | A1* | 10/2004 | Zilnyk | C03B 37/01211 65/412 |
| 2005/0274149 | A1* | 12/2005 | Hoppe | C03B 37/01214 65/411 |
| 2010/0008634 | A1* | 1/2010 | Guertin | C03B 37/02763 385/126 |
| 2013/0291604 | A1* | 11/2013 | Frigerio | C03B 37/01211 65/412 |

OTHER PUBLICATIONS

Wayback machine, date comfirmation for https://www.delphiglass.com/96-coe-glass/cane/warms-rod-and-twisted-cane-assortment-96-coe. (Year: 2010).*
Delphi glass example of a tuxedo twisted cane, https://www.delphiglass.com/96-coe-glass/cane/tuxedo-twisted-cane-assortment-96-coe, 2010. (Year: 2010).*
YouTube video of How to make Twisted Stringers by Delphi glass, https://www.youtube.com/watch?v=-tLpAxk2DaU, 2010 (Year: 2010).*
Kerkvliet, The Twist and Shout of Lampworking!, http://www.gossamerglass.com/GG/articles/article2.html, Nov. 9, 2016, pp. 1-6.
Guy Hollington, Cane Pickup, https://www.guyhollington.com/techniques, not dated, pp. 1, 4 and 5.
Canes of Glass, http://www.glass-fusing-made-easy.com/canes-of-glass.html, Jul. 30, 2016, pp. 1-2.
Cornin Tettinger, Welcome to Corinabeads, Lampwork beads you just can't live without, http://www.corinabeads.com/pages/drtwistcane.php, Jan. 15, 2017, pp. 1-3.
Wikipedia, Caneworking, https://en.m.wikipedia.org/wiki/Caneworking, Aug. 15, 2016, pp. 1-9.
Art 554: intermediate/Advanced Glass, Week 3: Punties and Cane Pulling, https://web.education.wisc.edu/art554/week-3-punties-and-cane-pulling/, Feb. 11, 2014, pp. 1-2.
Kari Russell-Pool, How it all works, http://www.karirussell-pool.com/how-it-all-works/fnzfzshcffvranlwvq00t17berhur8, Feb. 3, 2017, p. 1.
Pittsburgh Glass Center, Bowled Over by Cane, https://www.pittsburghglasscenter.org/classes/bowled-over-by-cane, 2018, pp. 1-5.
Scott Benefield Cane Masterclass, https://theglasshub.wordpress.com/tag/glassblowing-cane/, Dec. 6, 2017, pp. 1-7.

* cited by examiner

TWISTED GLASS CANES FOR ARTISTS

CROSS-REFERENCE TO RELATED APPLICATION

This patent application claims the benefit of U.S. Provisional Application 62/463,693, filed Feb. 26, 2017, the entire disclosure of which is hereby incorporated herein by reference.

TECHNICAL FIELD

The present invention pertains to twisted glass canes for artists, and their manufacture.

BACKGROUND

In the glass art world, canes typically consist of an elongated piece of glass, having the geometry of a rod. Traditional names of cane, which originate in Italy and traditional Italian glass working, include Latticino and Filigrana, which are commonly used to refer to twisted cane. Cane, whether twisted or not, may be incorporated into a functional piece of glassware or glass art, or both. Cane can be one color, clear, or can have bands of colored glass twisted around the central axis in a helical pattern. The cane is typically on the order of several millimeters to several centimeters in diameter. The production of cane by glass artists is traditionally a manual process that is very labor-intensive and lacks a high level of repeatability. Use of cane is highly desirable by glass artists. Not all artists possess the skill or resources to produce their own twisted cane. Some artists spend many months just making cane and then the rest of the year using it for their artwork.

There is a variety of types and designs of twisted cane, and the level of variability possible is infinite Some twisted cane may incorporate many thin lines, as many as dozens or more, that are evenly, or not evenly, spaced around the perimeter or only a few lines, such as one or two. The lines may be all the same color or varying colors. Additionally, the size of the lines and their depth from the circumference, towards the central axis of the cane, can be varied to create depth in the design of the twisted cane. The cane may or may not include lines of color, but instead or in addition to lines, may incorporate flat strips of colored glass that either wrap around the perimeter of the cane or are centrally located. When the twisted cane is formed from the initial assembly, the flat pieces result in what appears visually as a flat ribbon twisted evenly running down the length or around the perimeter of a clear piece of glass. The ribbon may be located in line with the central axis or offset from the central axis. The cane may also use a tinted or translucent colored glass instead of simple clear glass.

Artists that use glass as their medium often will cut lengths of twisted cane and lay the lengths side-by-side on a refractory surface and heat them, while applying pressure from opposing sides to fuse the canes into a sheet. The sheet is then manipulated using traditional glass-working techniques into a tube, and further a final shape or form as desired by the glass worker. This process of manipulating the twisted cane as a sheet or tube allows the glass worker to produce highly complex and ornate patterns. Abstract and functional works of art such as a pipe or articles of jewelry such as a pendant or a glass ring can be formed from twisted glass cane.

The traditional method for how twisted cane is produced is by successively building hot glass up on a central piece of glass or on the end of a metal rod, essentially building a large cylinder from the central axis outward. For example, the artist may start with a glass rod, on which ribbons or stripes of clear or colored glass are applied, and then more molten glass is put around these components, thereby successively building outward in steps, with many layers possibly being added for relatively complex designs. This method is a manual process depending on the precision of the glass worker's hands and takes substantial time and skill. Once the cylinder is constructed with the colored glass distributed within as desired, the cylindrical mass is heated, typically by moving the mass in the flame of a torch or within a gloryhole (re-heating furnace) so that the entire cylinder is heated uniformly to a plastic state, and then the cylinder is twisted, and concurrently stretched, to elongate it and make twisted cane with the final diameter being smaller relative to the diameter of the initial cylindrical assembly, the twisted can having one or more helixes of colored glass (unless the colored glass is at the central axis, in which case it will not form a helix). Alternatively, colored glass may be fed onto the rod during the heating process, starting from an end of the rod, so that the colored glass is layered onto the rod. Narrow strips or wider ribbons may be used to create different patterns of lines or strips of differing widths.

It is known to use traditional draw towers without a vacuum for applications such as twisting hollow hexagonal tubes of lead silicate glass for electron multiplier assemblies, or with a vacuum but without twisting to make specialty optical fibers for fiber-optic applications from a core bar of an optical glass slid into a cladding tube.

SUMMARY

It is an object of the invention to provide a mechanized process for producing a commercial supply of twisted cane for the glass art community.

According to the invention, a glass cane is manufactured by filling a glass tube with a combination of glass structures forming a cross-sectional pattern within the glass tube, to form a preform. The preform is attached to a draw assembly, such as a draw tower. The draw assembly is operated to draw the preform to a reduced-diameter glass cane by passing the preform through a furnace of the draw assembly while pulling the preform or the reduced-diameter glass cane and rotating the preform or the reduced-diameter glass cane.

Before the step of filling the glass tube, one end of the glass tube may be closed or plugged. The glass structures may include a combination of glasses of differing colors, and may further include clear glass. In certain embodiments the preform is attached to the draw assembly vertically and the preform is drawn in a vertical direction. The step of attaching the preform to the draw assembly may include connecting an open end of the preform with a vacuum source, and the step of operating the draw assembly may include operating the vacuum pump while performing the step of passing the preform through the furnace while rotating and pulling. The step of connecting the open end of the preform with a vacuum source may include attaching the open end to a reduction fitting having a connector for connecting with the vacuum source. A coupling may be secured around the preform and the reduction fitting and so that at least a partial hermetic seal is formed between the preform and the reduction fitting. In certain embodiments, the glass tube is a glass body produced in a manner so as to have multiple bores running through its length, and the step of filling the glass tube includes filling the multiple bores. The glass body having multiple bores may be produced by filling a glass tube with glass structures at least some of which are acid soluble, heating the glass tube to fuse the glass structures, and then removing the acid soluble glass structures with acid.

The details of various embodiments of the invention are set forth in the accompanying drawings and the description below. Numerous other features and advantages of the invention will be apparent from the description, the drawings, and the claims.

DESCRIPTION OF THE DRAWINGS

Identical parts are indicated by the same reference numerals.

DETAILED DESCRIPTION

The present invention provides an alternative method of producing twisted cane, which involves stacking rods, sheets, tubes, or elongated bars of colored or clear glass within a glass tube. The glass rods, sheets or elongated bars and the tube may be soda lime silica glass or borosilicate glass or any suitable glass composition. The typical scale of the glass tube used ranges greatly from 14 millimeters outside diameter to as much as 280 millimeters outside diameter. Prior to stacking the rods, sheets, tubes, or bars of colored or clear glass within the glass tube, one end of the glass tube is closed by heating to soften and seal the tube (by heating, forming, and fusing), to enable the glass tube to support the weight of glass to be stacked within it. After the heating, excess glass material at the fused end of the preform may be removed using pliers, tweezers, or tongs. It is also possible to seal the end of the tube without heating, by using a mechanical mechanism such as an expansion plug (such as an O-ring with a washer on each side of the O-ring, the diameters of the washer and O-ring being the same but the O-ring expanding if compressed), a gob of hot glass, an epoxy, a cork, tape, Styrofoam, or any other method, which will provide adequate support to the glass contained within and provide at least a partially hermetic seal. The closed end is ideally flat with a face 90 degrees perpendicular to the length of the tube, so that there is no unevenness of the upper ends of the rods, sheets, or bars. However, a round or pointed bottom or alternative shape is acceptable. A pointed shape, for instance, has the advantage of heating faster in the furnace and reducing the time to bait the draw assembly system. The glass rods, sheets, or bars are stacked inside the tube to create a cross-sectional pattern. Any combination of clear or colored glass rods, sheets, elongated bars, tubes, frit (ground-up glass), or powder, etc. (collectively known as glass structures) may be used to fill the glass tube to create a cross-sectional design. Frit or powder might be used, for example, in circumstances in which an artist desires a less-defined boundary state between colors. It is possible to create multiple cross-section designs per glass tube by changing the cross-sectional pattern of the preform along the length of the tube.

Figure 1:
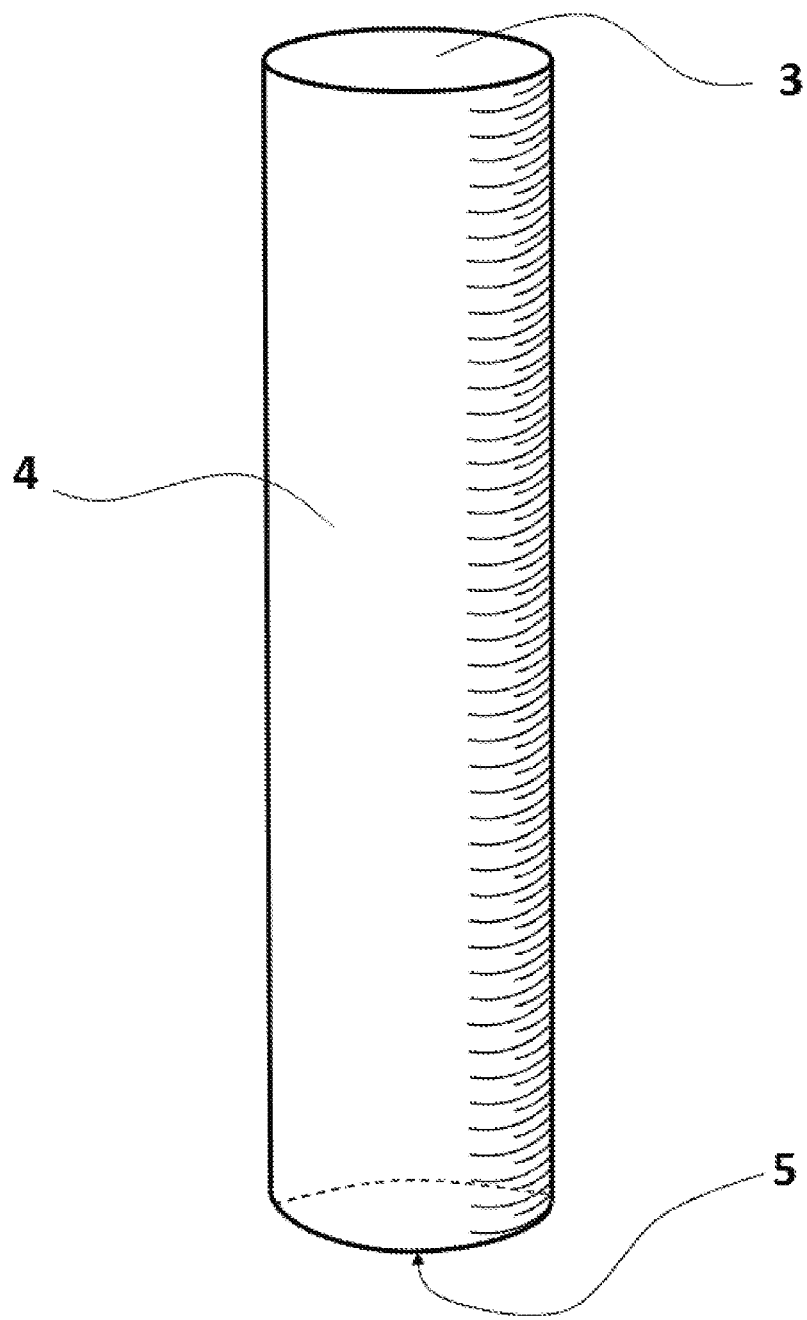
FIG. 1 is a drawing of a glass cylinder with one end sealed closed and one end left open.

FIG. 1 illustrates a glass cylinder 4 with one end 5 sealed closed and one end 3 left open. Glass cylinder 4, which is also referred to as a tube, can be clear glass or colored or may be made of an acid soluble glass or a traditional chemically durable glass. In certain embodiments, glass cylinder 4 may have a diameter between 14 millimeters and 280 millimeters and a length of between 100 millimeters and 3000 millimeters. Instead of a cylinder, the glass tube may have, for example, a cross section that is square, rectangular, triangular, parallelogram, etc. A glass tube having a circular cross section will result in a twisted cane having a circular cross section, but a glass tube having a triangular cross section, for example, will result in a cane having a twisted triangular shape.

Figure 2:
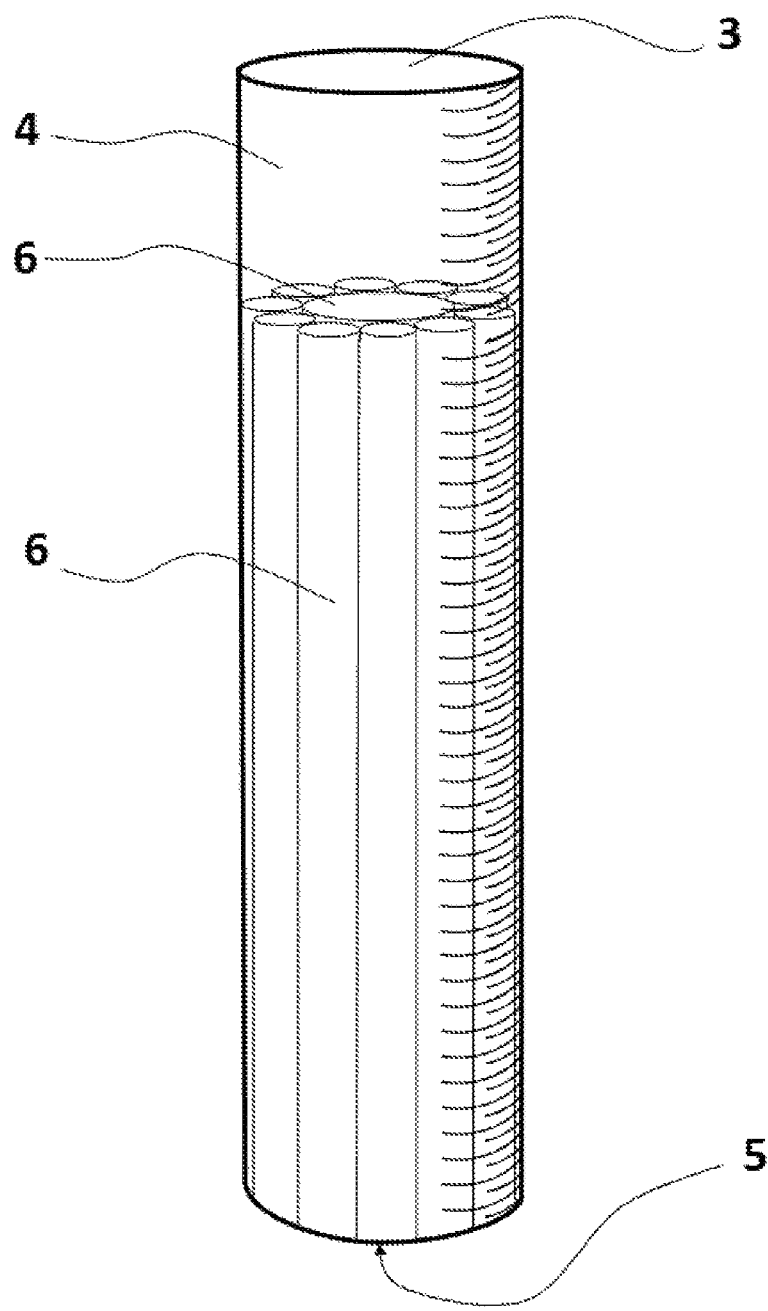
FIG. 2 is a drawing of a glass preform consisting of the glass cylinder of FIG. 1 with glass rods of various diameters stacked inside.

FIG. 2 is a drawing of a glass preform consisting of a glass cylinder 4 with one end 5 sealed closed and one end 3 left open with glass rods 6 of various diameters stacked inside. Rods 6 may be clear glass or colored glass, and may be acid-soluble glass or glass that is of high chemical durability.

The glass of cylinder 4 and rods 6 may be, for example, borosilicate or soda lime silicate, and may be, variously, clear or colored (opal, opaque colored, transparent colored, or dichroic colored glass).

The preform, which includes the tube, sealed on one end and containing the clear and colored glass rods, sheets, or elongated bars, is mounted in a machine that feeds, at a controlled rate, the sealed end of the preform into a hot zone that is above the glass transition temperature (softening temperature) of the selected material so that the glass material is in its softening range, while pulling a vacuum on the inside volume of the tube and glass contained within. The vacuum removes air so as to reduce pressure within the tube to a pressure less than that of the surrounding atmosphere. As the preform is fed into the hot zone, the tube softens and collapses round the glass within, resulting in elimination of any interstitial free volume, such that the glass is fused together, leaving behind a void-free glass article. Thus, the tube collapses on itself, with all of the components of the preform collapsing on each other so that the preform becomes closed. The glass tube with the rods, sheets, tubes, or elongated bars of colored or clear glass contained within, is twisted at a controlled rate while it is fed into the hot zone and put under vacuum and pulled. The closed tube end, which is in the hot zone, drips and is pulled by a mechanism that capable of a maintaining a precise draw rate. The linear velocity at which the glass is drawn out of the hot zone is greater than the linear velocity at which the preform is fed into the hot zone, resulting in a reduction of the preform cross-section to a smaller diameter, while concurrently fusing all of the glass into one solid piece. A traditional fiber draw tower is a suitable apparatus for this process as long as the hardware configuration allows for the preform including the glass tube with glass contained within to be pulled and twisted at a controlled rate while a vacuum is simultaneously pulled on the free volume within. The preferred method of drawing the twisted cane from the hot zone is to use a set of tractor wheels, tractor belts, or mechanical claws, which successively pull the glass at a controllable and uniform rate.

Figure 3:
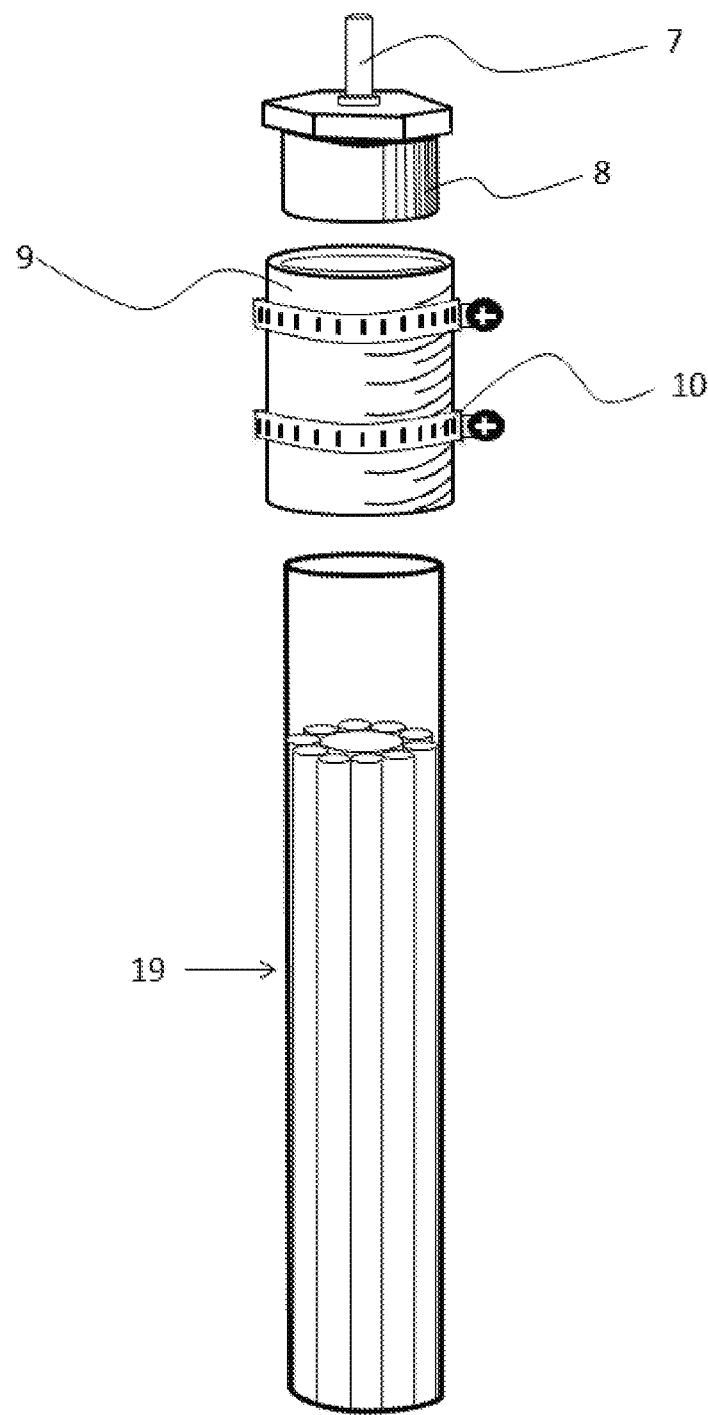
FIG. 3 is an exploded view of the glass preform of FIG. 2 along with a reduction fitting and a coupling.

FIG. 3 is an exploded view of preform 19, along with a reduction fitting 8 and a coupling 9. Preform 19 is coupled to reduction fitting 8, which has a nipple or connector 7 for attaching to a vacuum for the purpose of removing air or any residual gasses and reducing pressure within preform 19 to a pressure less than the surrounding atmosphere outside of preform 19. Coupling 9 is made of a flexible material that has low permeability to atmosphere and adequate physical strength to support preform 19 during processing. Coupling 9, which may be a flexible piece of tubing, is secured to glass preform 19 and reduction fitting 8 by hose clamps 10, which constrict coupling 9 securely around preform 19 and reduction fitting 8 when tightened, so that preform 19 cannot be pulled out of coupling 9 while preform 19 is pulled downward during operation of the draw tower, and so that at least a partial hermetic seal is formed between preform 19 and reduction fitting 8. Nipple 7 is hollow and allows the passing of liquid or gas into or out of the internal volume of preform 19. Reduction fitting 8 is a pipe fitting that allows the preform to rotate, with nipple 7 being threaded into a vacuum-tight rotating union that functions as a vacuum swivel or rotating vacuum coupling that maintains a vacuum seal but can be rotated indefinitely.

Figure 4:
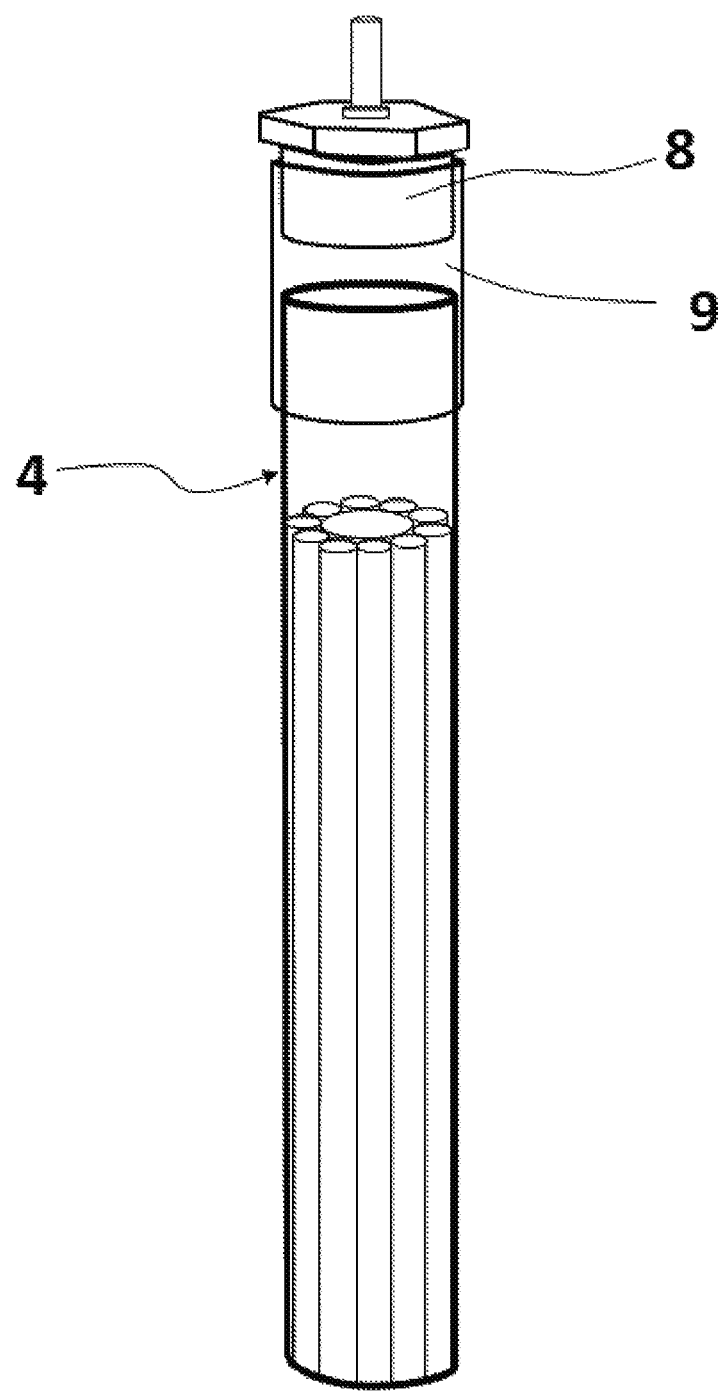
FIG. 4 is an assembled view of the components in FIG. 3 with the coupling details removed and depicted as transparent for clarity.

FIG. 4 is an assembled view of the components in FIG. 3 with the coupling details removed and depicted as transparent for clarity. The outside diameter of glass tube 4 and reduction fitting 8 are slightly smaller than the inside diameter of coupling 9. When fully assembled, the gap between glass tube 4 and the reduction fitting should be minimized so that minimum constriction of coupling 9 is required to secure it to tube 4 and reduction fitting 8. The open end of tube 4 must be mechanically coupled to reduction fitting 8, which is in turn attached to a rough vacuum pump, with a tight seal being provided by coupling 9 with very little seepage to enable a vacuum to be created within tube 4.

Figure 5:
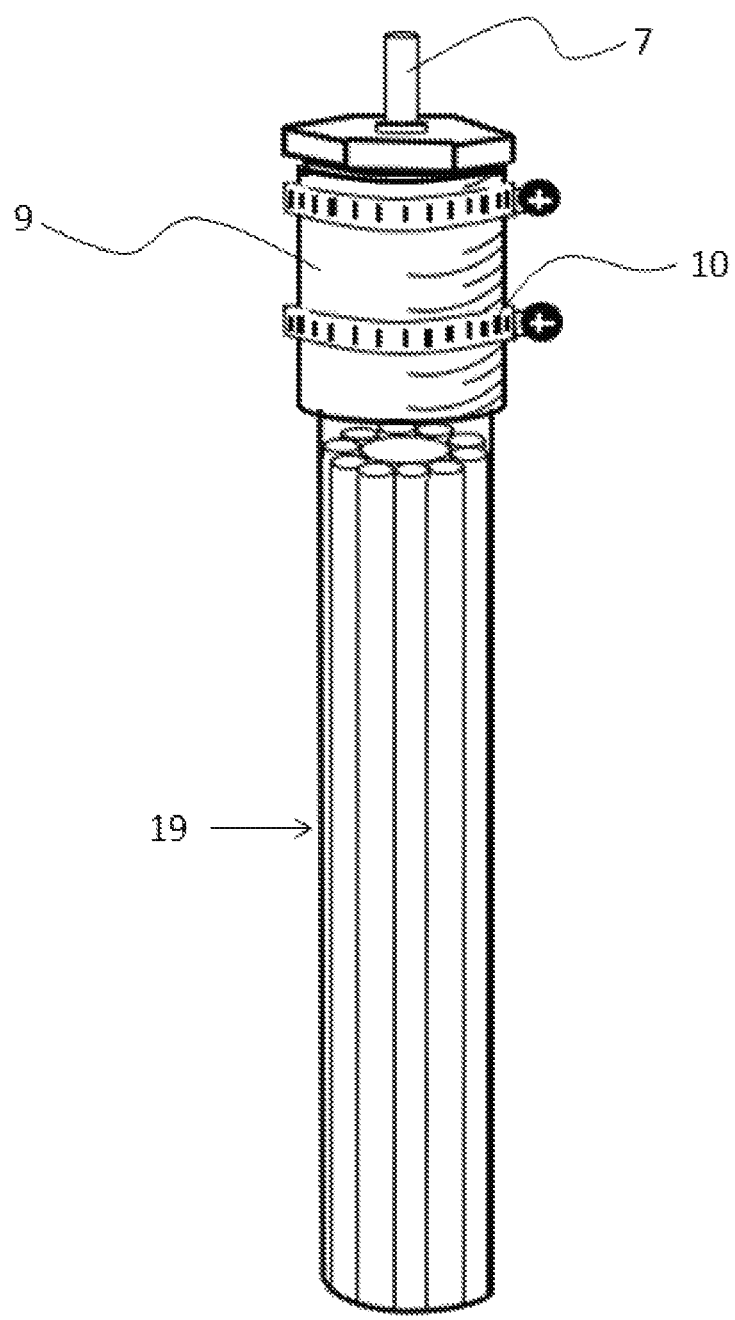
FIG. 5 is detailed assembled view of the components in FIG. 3, including the components of the coupling.

FIG. 5 is detailed assembled view of the components in FIG. 3, including the components of coupling 9.

Figure 20:
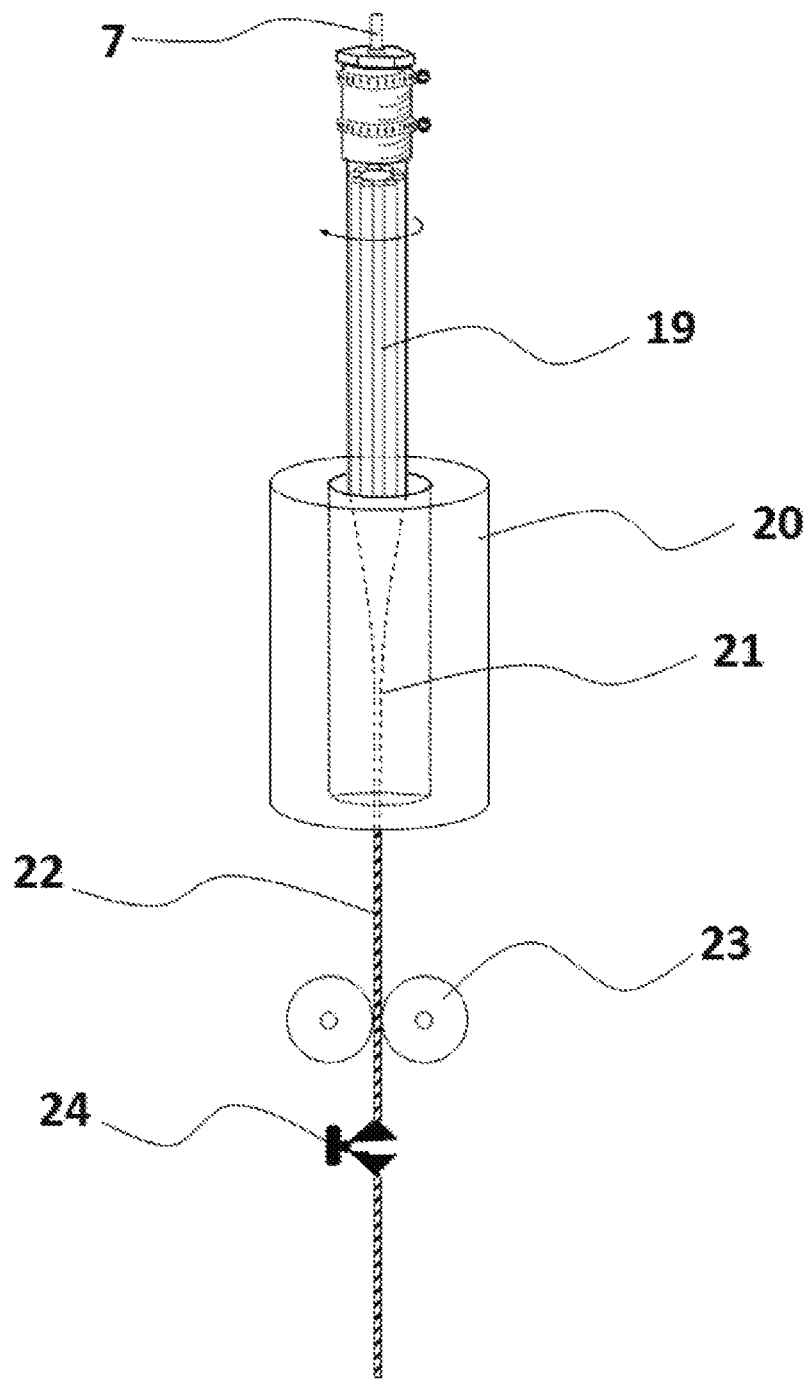
FIG. 20 is a schematic representation of a system for drawing a preform for production of twisted glass cane.

FIG. 20 is a schematic representation of a system for drawing preform 19 for production of twisted glass cane. Connector or nipple 7 is attached to a rotation mechanism and a vacuum pump to remove air and reduce pressure within preform 19 so that while being heated in high-temperature furnace 20, the glass collapses and voids 14 are eliminated. Preform 19 is lowered into a high-temperature furnace 20 while suspended by vacuum connection nipple 7 and rotated. A preferred lowering mechanism, due to its simplicity, may be, for example, a linear slide having a long ball screw mechanism with a six-foot long threaded post and a long bolt and nut that can be twisted through a coupling system having a servo motor, such that the preform can be secured to the linear slide and be traversed upwards or downwards at a controlled rate. Alternatively, a set of claws or over-under fingers may be used as a mechanism to lower the preform in a manner similar to pulling rope with two hands. In alternative embodiments, the preform may be drawn up vertically rather than lowered. As the preform is lowered at a controlled rate into the furnace, glass 22 exiting the furnace is drawn by a tractor mechanism 23 that may include belts or wheels, at a rate faster than the rate it is fed into the furnace. Tractor mechanism 23 may be include two wheels (tractor wheels) or belts that push or pinch the glass between them, all driven by a motor. The result is preform 19 being attenuated in region 21 into a smaller diameter. As the glass is pulled by tractor mechanism 23 it is cut at regular intervals by a cutting mechanism 24, which may be a pair of blades that are electrically or pneumatically actuated. A diameter measurement device may be incorporated into the system at a location where the glass has been attenuated, in order to provide feedback on the extent of attenuation of the glass, to ensure against fluctuation in dimension by adjusting the feed rate or pulling rate. The diameter measurement device may be a laser micrometer. In certain embodiments the diameter is reduced by a reduction ratio of about 1/8 to 1/15, such as from 40-50 millimeters to 3-10 millimeters. The mechanism for imparting rotating can be placed either above or below the furnace, while the mechanism for holding the cane or preform stationary is located on the other side of the furnace. It is considered easier to impart rotation above the furnace because it is easier to manipulate and hold the preform than the twisted glass below the furnace. If imparting rotation to the twisted cane below the furnace, a more complex mechanism, perhaps having three wheels instead of two, can be used to pinch and drive the twisted cane.

Figure 25:
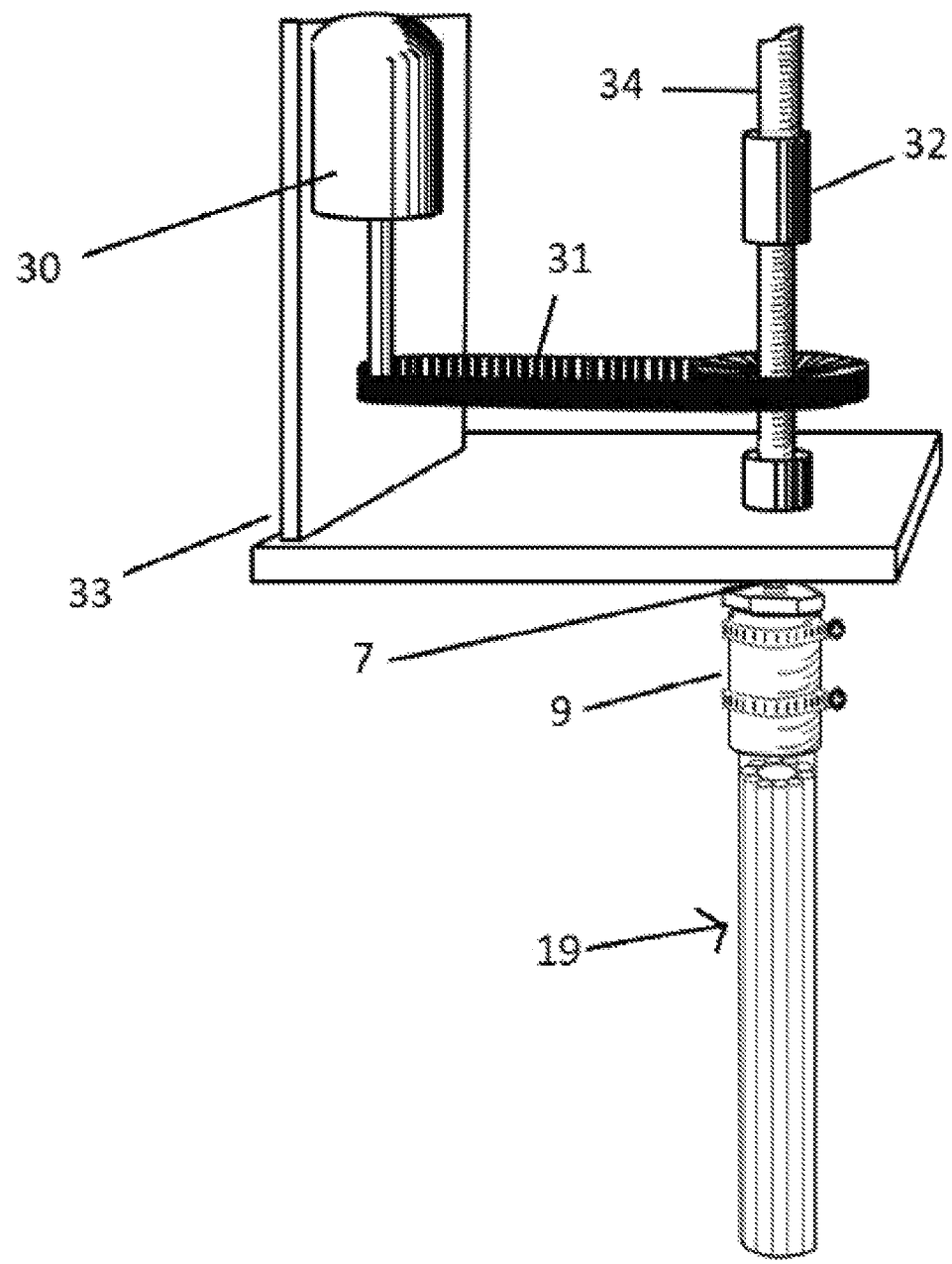
FIG. 25 is a drawing of a rotation mechanism used to spin a glass preform 19 during drawing of the glass into twisted cane.

FIG. 25 illustrates an embodiment of a rotation mechanism used to spin glass preform 19 during drawing of the glass into twisted cane. The rotation mechanism includes an electric motor 30 and a belt or chain 31 to couple the rotational force to the preform. Fixture 33 holds this whole assembly on a draw tower. Hose or connector 34 leads to a vacuum pump. Vacuum-tight seal 32 can rotate freely 360 degrees and maintain vacuum. Thus, the open end of the preform tube is mechanically sealed via a rotating union to which the preform tube is attached.

After the preform has been loaded into the draw tower, hung vertically, a vacuum is pulled on the open end of the preform, and a tip of the preform is lowered into the furnace of the draw tower, thereby closing any space between the preform filler materials and between the preform filler materials and the outer tube of the preform. Glass will begin to drip out of the furnace at a controlled rate determined by the viscosity curve of the glass and the furnace temperature. The dripping glass may be caught with a bucket or allowed to fall on the floor, and eventually baiting is accomplished by placing a long piece of the glass below the furnace into a tractor mechanism, which can be accomplished by reaching up into the furnace with tongs and pulling the glass down to be fed into the tractor mechanism. If, on the other hand, a mechanical sealing technique has been used to close the lower end of the preform, then the heating process must begin with the lower end of the preform positioned below the heating zone. In certain embodiments the preform is rotated at between one and 1000 rotations per minute, and more preferably between two and 200 revolutions per minute. The furnace temperature, downdrive rate, and rate of pulling are selected to draw down the preform into a rod having the same cross-section shape as the initial preform with a diameter or maximum cross-sectional dimension of between 2 and 20 millimeters in certain embodiments. Because the components of the preform are fed in and drawn out at a constant rate, a constant equilibrium process is executed over a period of time, with the attenuation and twisting occurring only where heat is being applied, as opposed to the entire preform being heated all at once. Equilibrium is achieved after an initial period of about ten minutes during which the diameter of the twisted cane can fluctuate in diameter, but the rate of pulling need not be adjusted during baiting and the initial period preceding equilibrium. The diameter of the twisted cane after equilibrium is achieved can be calculated based on the initial diameter of the preform and the ratio between the feed rate and the pulling rate. In certain embodiments about one and a half to two hours of processing time will produce about six pounds of finished product, and the speed of the process is about four feet per minute output speed. The speed of processing is limited by the time required to heat the glass up as it passes through the furnace.

If a non-glass material or method is used to seal the end of the tube, then during the drawing process, the sealed end of the tube is brought outside of the hot zone and is never passed through it. The non-glass end is pulled off at the initial application of the hot zone after the tube collapses under vacuum and heat, and discarded.

The tube and glass contained within the tube is not heated all at once, but progressively from one end of the preform to the other end during the process. There is an advantage to executing the drawing of the preform vertically in that effects of gravity need not be mitigated. However, in some instances it may be advantageous, for example due to space constraints or in the case of a very large assembly resting on a horizontal roller, to draw the tube with glass contained within either horizontally, or in a different orientation relative to the force of gravity and the plane of the surface of the earth, as long as uniformity is maintained by using sufficiently fast rotation so that glass does not droop due to gravity. The twist rate of the cane can be precisely controlled by controlling the rate that the preform including the tube with the glass contained within is rotated while it is fed into the hot zone. Alternatively, the cane may be twisted as it is drawn from the hot zone.

Figure 6:
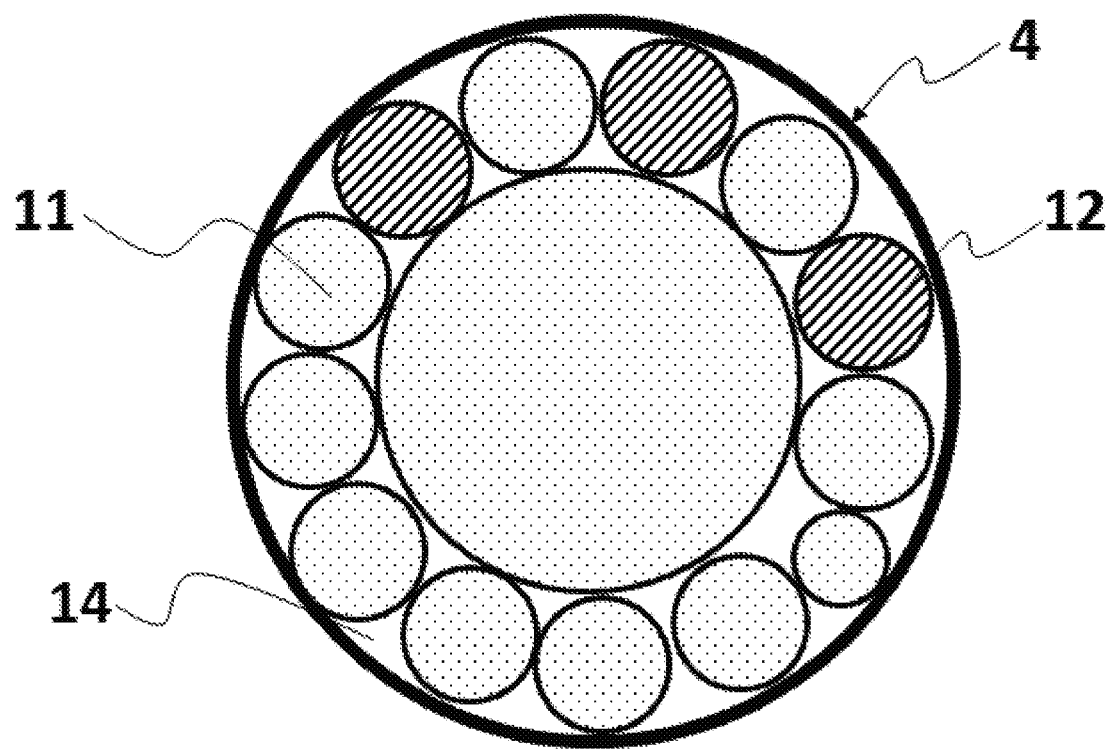
FIG. 6 illustrates a cross-section of a glass preform.

FIG. 6 illustrates a cross-section of glass preform 19 showing one possible configuration using clear glass rods 11 and colored glass rods 12 packed within glass tube 4 to form a desired cross-sectional distribution of clear and colored glass. The free volume 14 in the preform collapses during drawing of preform 19 and no voids remain in the final cane.

Figure 7:
FIG. 7 is a side view of a glass cane produced when the preform of FIG. 6 is drawn and rotated.
Figure 8:
FIG. 8 is a side view of a glass cane produced when the preform of FIG. 6 is drawn and rotated, but at a rate approximately four times the rate of rotation for the cane depicted in FIG. 7.

FIG. 7 is a side view of the glass cane produced when preform 19 with cross section shown in FIG. 6 is drawn and rotated. FIG. 8 is a side view of the glass cane produced when the preform 19 with cross section shown in FIG. 6 is drawn and rotated, but at a rate approximately four times the rate of rotation for the cane depicted in FIG. 7. The tightness of the helix depends on rotation speed relative to pulling rate and feed rate.

Figure 9:
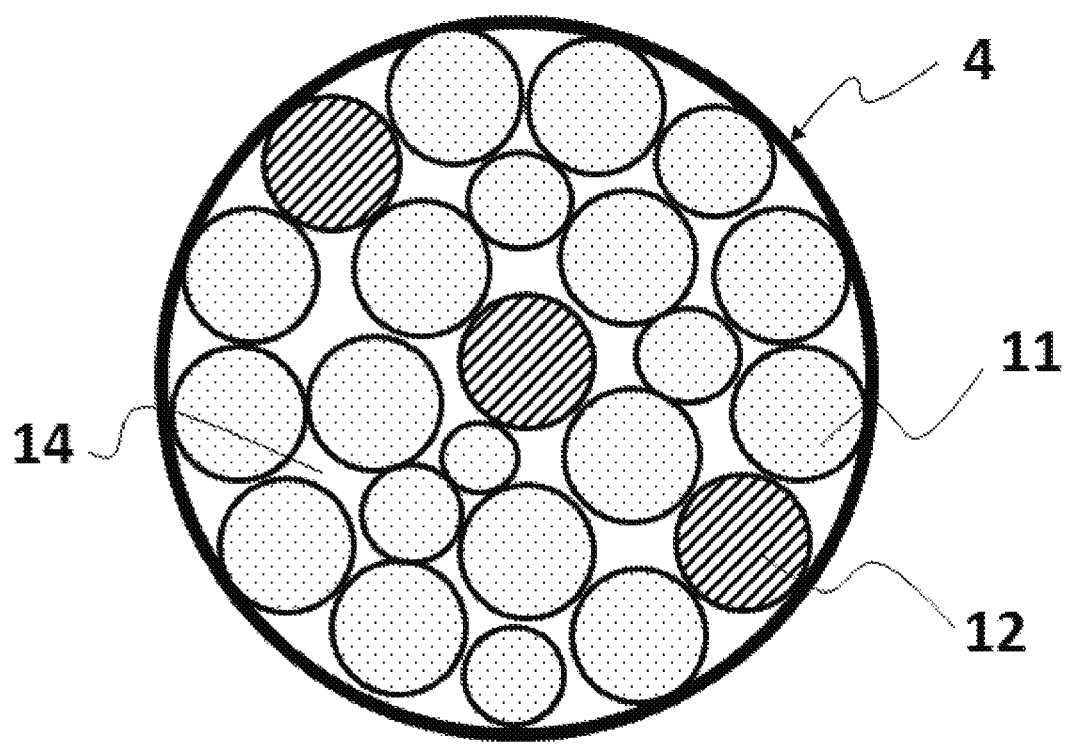
FIG. 9 illustrates a cross-section of another glass preform.

FIG. 9 illustrates a cross-section of another glass preform 19 showing one possible configuration using clear glass rods 11 and colored glass rods 12 packed within a glass tube 4 to form a desired cross-sectional distribution of clear and colored glass. The free volume 14 in the preform collapses during drawing of preform 19 and no voids remain in the final cane.

Figure 10:
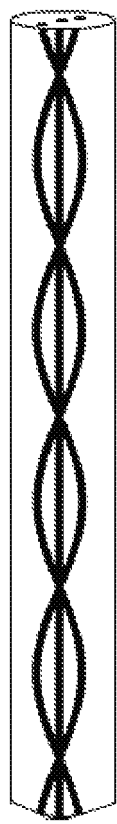
FIG. 10 is a side view of a glass cane produced when the preform of FIG. 9 is drawn and rotated.
Figure 11:
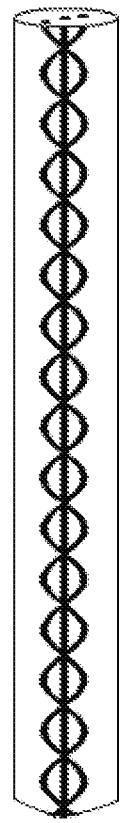
FIG. 11 is a side view of a glass cane produced when the preform of FIG. 9 is drawn and rotated, but at a rate approximately four times the rate of rotation for the cane depicted in FIG. 10.

FIG. 10 is a side view of the glass cane produced when preform 19 with cross section shown in FIG. 9 is drawn and rotated. FIG. 11 is a side view of the glass cane produced when the preform 19 with cross section shown in FIG. 9 is drawn and rotated, but at a rate approximately four times the rate of rotation for the cane depicted in FIG. 10.

Figure 12:
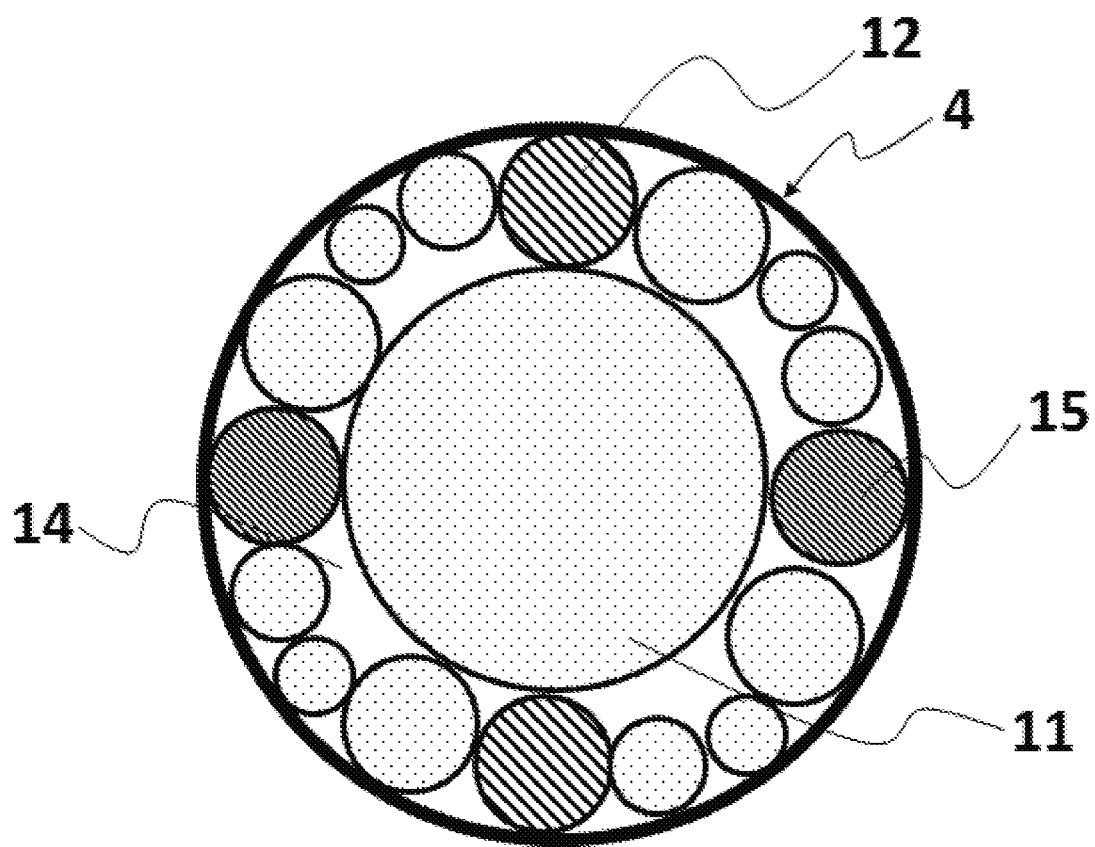
FIG. 12 illustrates a cross-section of yet another glass preform.

FIG. 12 illustrates a cross-section of another glass preform showing one possible configuration using clear glass rods 11 and two different colors of glass rods 12, 15 packed within a glass tube 4 to form a desired cross-sectional distribution of clear and colored glass. The free volume 14 in the preform collapses during drawing of preform 19 and no voids remain in the final cane.

Figure 13:
FIG. 13 is a side view of a glass cane produced when the preform of FIG. 12 is drawn and rotated.

FIG. 13 is a side view of the cane produced from forming a cane from the cross-section depicted in FIG. 12 when drawn and rotated.

Figure 14:
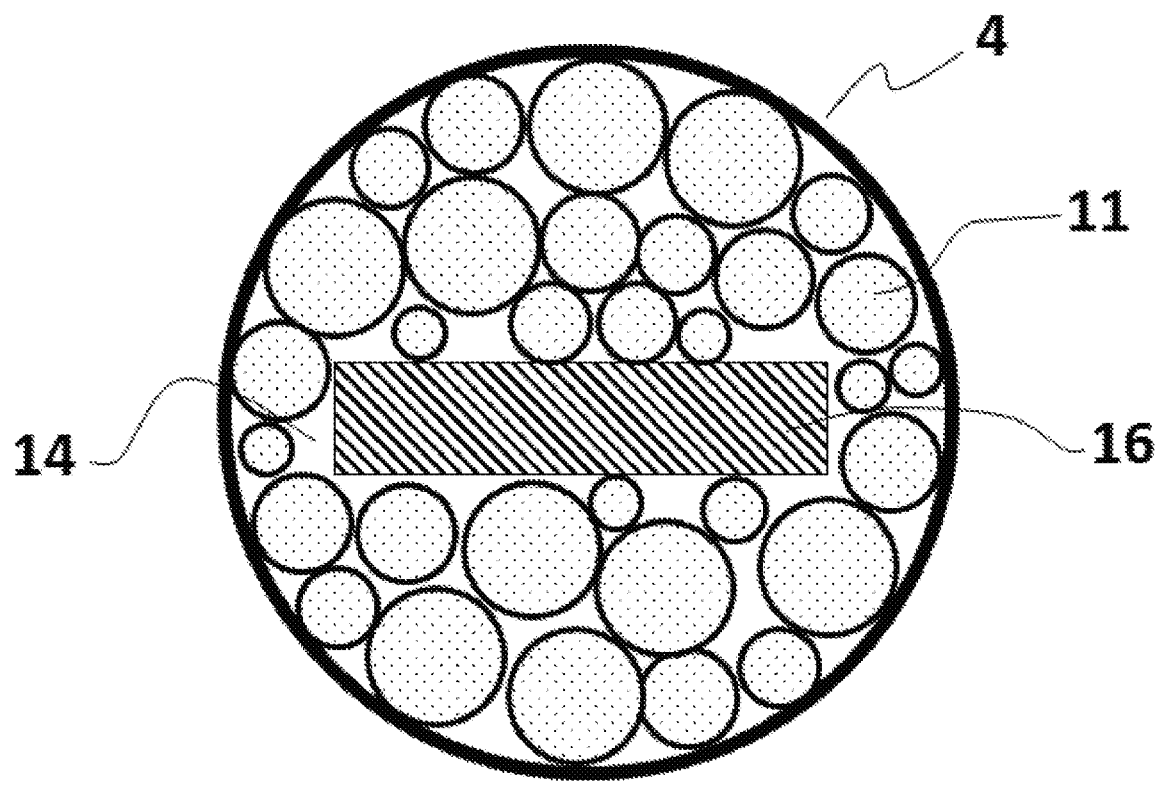
FIG. 14 illustrates a cross-section of yet another glass preform.

FIG. 14 illustrates a cross-section of another glass preform showing one possible configuration using clear glass rods 11 and a colored glass bar 16 packed within a glass tube 4 to form a desired cross-sectional distribution of clear and colored glass. The free volume 14 in the preform collapses during drawing of preform 19 and no voids remain in the final cane.

Figure 15:
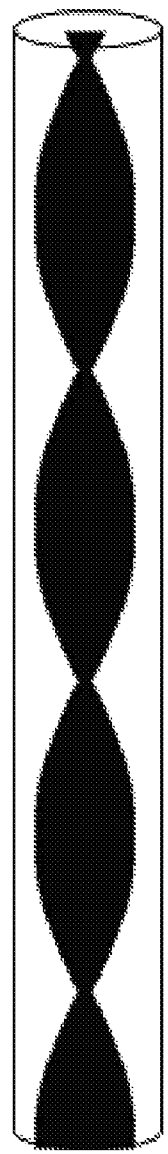
FIG. 15 is a side view of a glass cane produced when the preform of FIG. 14 is drawn and rotated.
Figure 16:
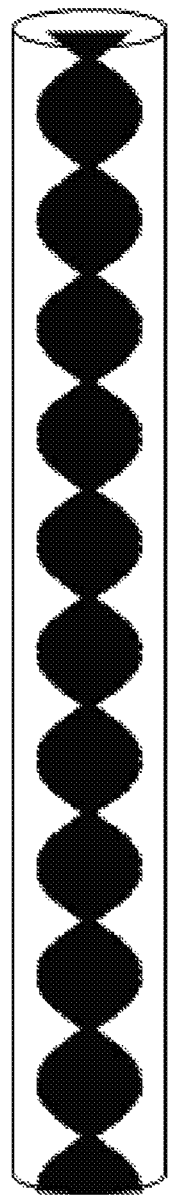
FIG. 16 is a side view of a glass cane produced when the preform of FIG. 14 is drawn and rotated, but at a rate approximately four times the rate of rotation for the cane depicted in FIG. 15.

FIG. 15 is a side view of the cane produced from forming a cane from the cross-section depicted in FIG. 14 when drawn and rotated. FIG. 16 is a side view of the cane produced from forming a cane from the cross-section depicted in FIG. 14 but rotated at a rate approximately four times the rate of rotation for the cane depicted in FIG. 15.

Figure 17:
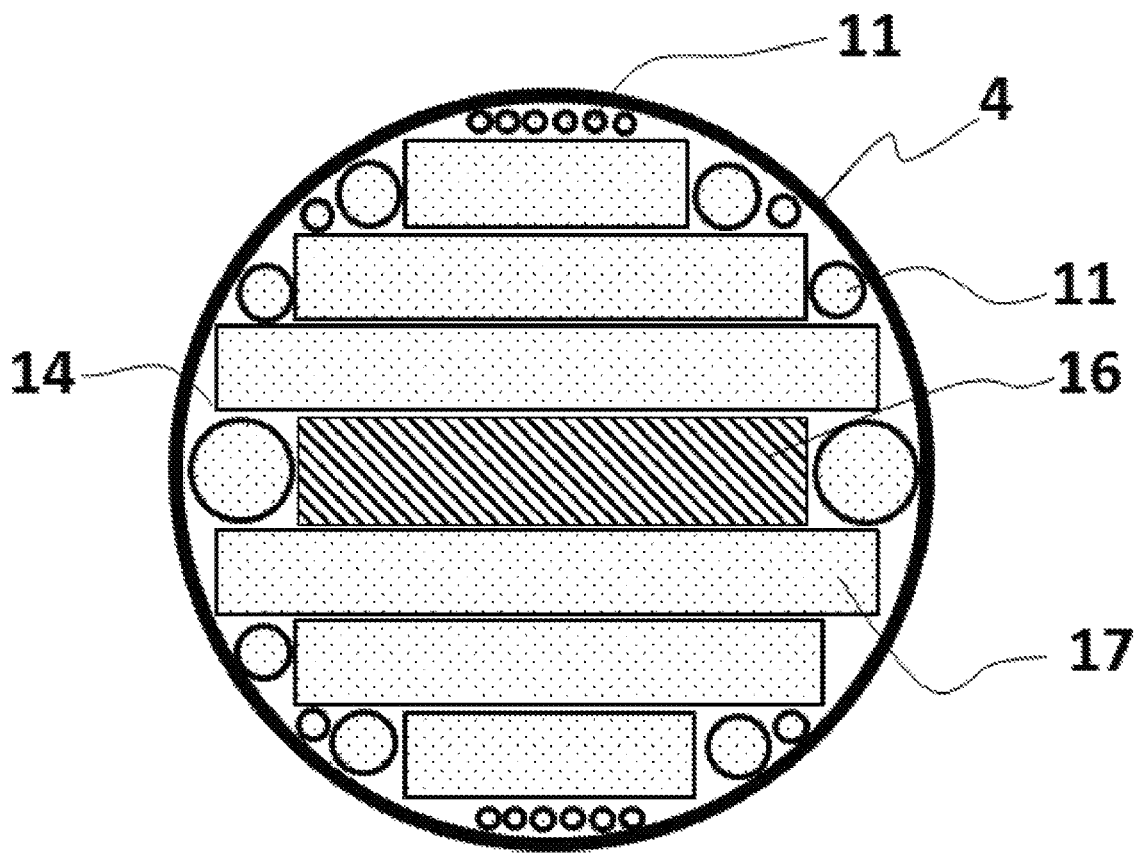
FIG. 17 is a cross-section of yet another glass preform.

FIG. 17 is a cross-section of another glass preform 19 showing one possible configuration using clear glass rods 11, clear glass bars 17, and a colored glass bar 16 to form a cross-sectional pattern. Although the stacking method of FIG. 17 differs from the stacking method of FIG. 14, the end product produced from the glass preform of FIG. 17 is the same as for the glass preform of FIG. 14, and the stacking method can be selected based on the relative availability of rods versus strips or bars.

Figure 18:
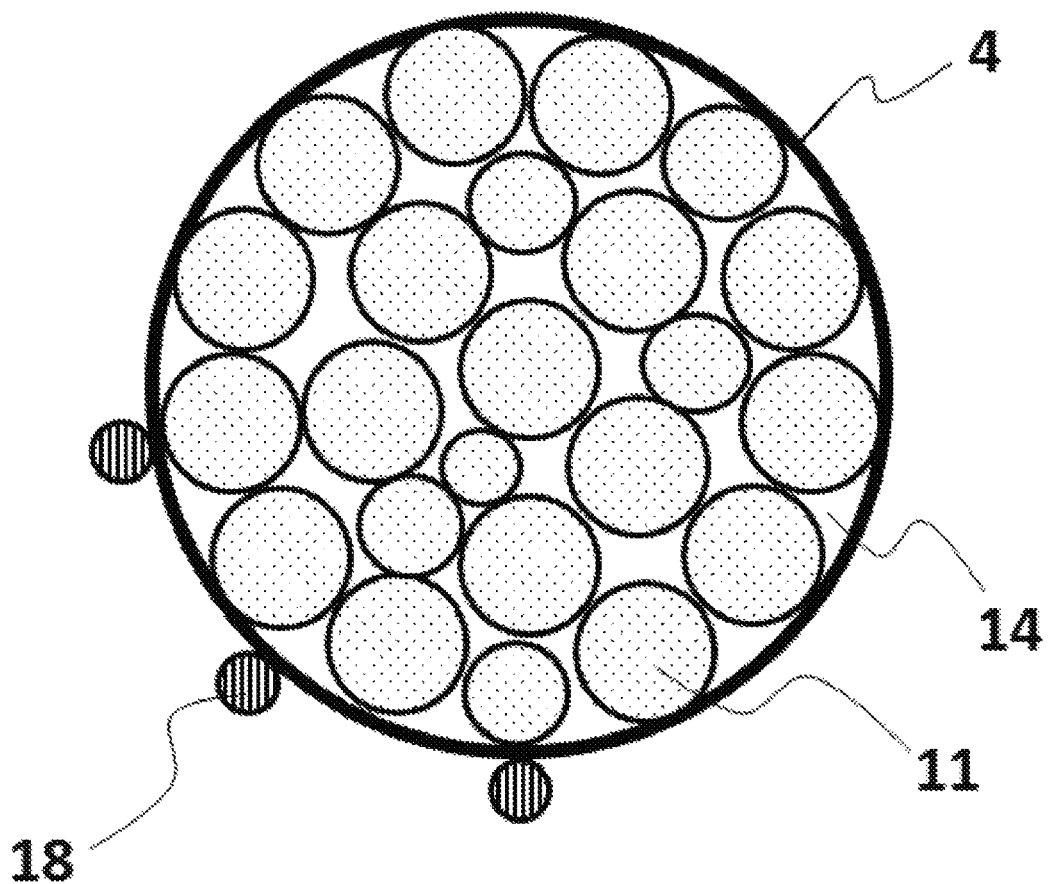
FIG. 18 illustrates a cross-section of yet another glass preform.

FIG. 18 is a cross-section of another glass preform showing one possible configuration using clear glass rods 11 and colored glass rods 18 that are attached to the outside of glass tube 4 to form a cross-sectional pattern.

Figure 19:
FIG. 19 is a side view of a glass cane produced when the preform of FIG. 18 is drawn and rotated.

FIG. 19 is a side view of the cane produced from forming a cane from the cross-section depicted in FIG. 18 when drawn and rotated. In this embodiment, the colored glass is on the surface of the finished cane and is not encased by tube 4.

Figure 21:
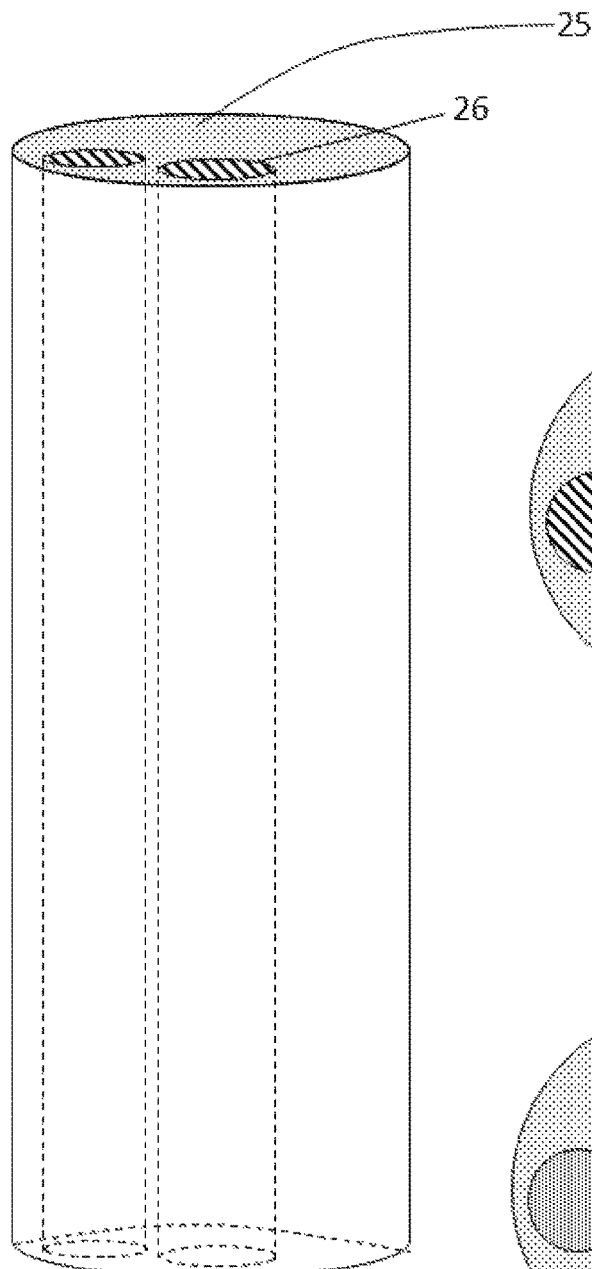
FIG. 21 is a drawing of a preform made using a glass body that is produced in a way to have bores running the entire length.

FIG. 21 illustrates a preform made using a glass body 25 that is produced in a way to have bores 26 (cylindrical, square, or any cross-sectional geometry) running the entire length. Colored glass rods 27 are slid into glass body 25 to yield a preform that can be drawn in the manner described in FIG. 21. Glass body 25 may be produced by an extrusion process yielding a single piece of glass with controlled bores running the entire length. Additionally, glass body 25 may be produced by building a preform 19 with some of the glass rods being acid soluble. Preform 19 is heated and consolidated to remove all air and fuse the glass rods. After the preform is allowed to cool, it is then submerged in an acid bath, thereby selectively removing only the acid soluble glass resulting in precision bores of uniform cross-sectional geometry down the length of glass body 25.

Figure 22:
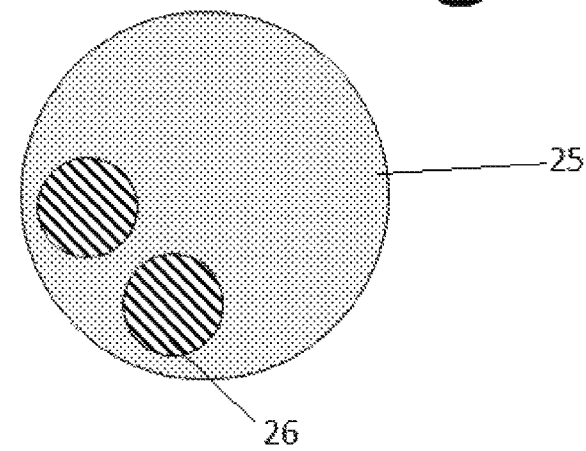
FIG. 22 is a top view of the glass body shown in FIG. 21.
Figure 23:
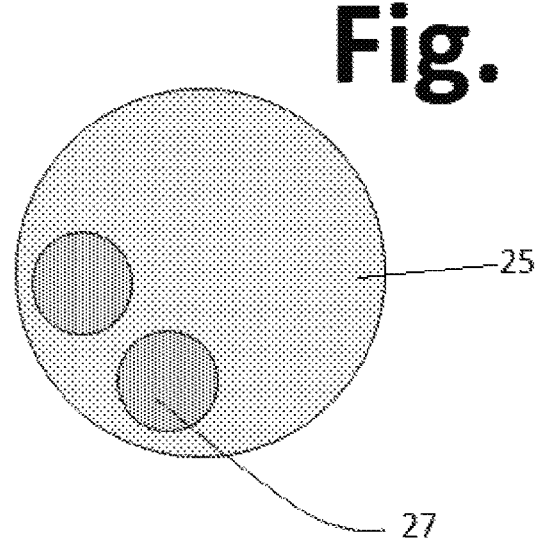
FIG. 23 is a top view of the glass body shown in FIG. 21 with glass rods inserted into the bores of the glass body.
Figure 24:
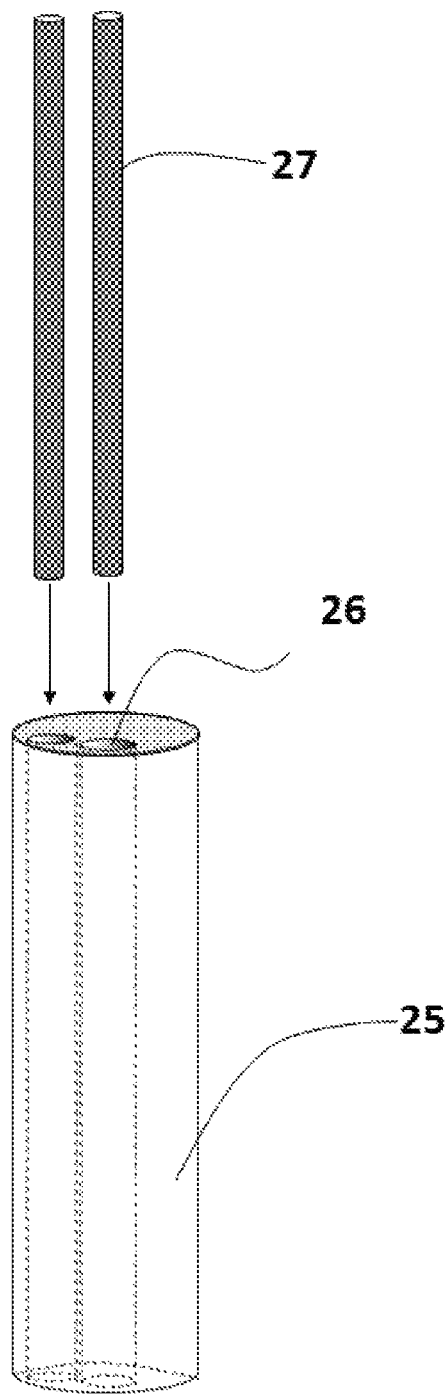
FIG. 24 is a drawing of rods being inserted into the glass body shown in FIG. 21.

FIG. 22 illustrates a top view of glass body 25 with cylindrical bores 26 running the whole length of glass body 25. FIG. 23 illustrates glass body 25 with colored glass rods 27 inserted into the cylindrical bores, and FIG. 24 illustrates the colored glass rods 27 being inserted into glass body 25.

There has been described twisted glass canes and methods for their manufacture. While several particular forms of the invention have been illustrated and described, it will be apparent that various modifications and combinations of the invention detailed in the text and drawings can be made without departing from the spirit and scope of the invention. Accordingly, it is not intended that the invention be limited, except as by the appended claims.

What is claimed is:

1. A method of manufacturing twisted glass cane, comprising:
    filling a glass tube with a combination of colored and clear glass structures forming a cross-sectional pattern within the glass tube, to form a preform;
    attaching the preform to a draw machine and connecting an open end of the preform with a vacuum source; and
    operating the draw machine to draw the preform to a reduced-diameter glass cane having a visually perceptible twisted pattern of colored glasses for incorporation into a piece of artwork, by passing the preform through a hot zone while pulling the preform or the reduced-diameter glass cane and rotating the preform or the reduced-diameter glass cane and while operating the vacuum source.

2. A method in accordance with claim 1, wherein the step of connecting the open end of the preform with a vacuum source comprises attaching the open end to a reduction fitting having a connector for connecting with the vacuum source.

3. A method in accordance with claim 2, further comprising securing a coupling around the preform and the reduction fitting and so that at least a partial hermetic seal is formed between the preform and the reduction fitting.

4. A method in accordance with claim 1, wherein the draw machine is a draw tower assembly and the preform is attached to the draw tower assembly vertically and the preform is drawn in a vertical direction.

5. A method in accordance with claim 1, comprising, before the step of filling the glass tube, closing or plugging one end of the glass tube.

6. A method in accordance with claim 1, wherein the glass structures comprise a combination of glasses of differing colors.

7. A method in accordance with claim 1, further comprising, before the step of attaching the preform to the draw machine, attaching at least one additional glass structure to an outer surface of the glass tube of the preform.

8. A method in accordance with claim 1, wherein the glass tube is a glass body produced in a manner so as to have multiple bores running through its length, and the step of filling the glass tube comprises filling the multiple bores.

9. A method in accordance with claim 8, wherein the glass body is produced by filling a glass tube with glass structures at least some of which are acid soluble, heating the glass tube to fuse the glass structures, and then removing the acid soluble glass structures with acid.

10. A method in accordance with claim 1 wherein the twisted glass cane comprises latticino twisted glass cane.

11. A method in accordance with claim 1 wherein the twisted glass cane comprises filigrana twisted glass cane.

12. A method in accordance with claim 1, wherein the hot zone comprises a furnace of the draw machine.

\* \* \* \* \*